Jan. 16, 1968 M. D. BERGAN 3,364,460

SEAMED SLEEVE CONNECTOR

Original Filed Oct. 1, 1962

2 Sheets-Sheet 1

INVENTOR
Martin D. Bergan
BY
James C. Ledbetter
ATTORNEY

Jan. 16, 1968 M. D. BERGAN 3,364,460

SEAMED SLEEVE CONNECTOR

Original Filed Oct. 1, 1962 2 Sheets-Sheet 2

INVENTOR
*Martin D. Bergan*
BY
*James C. Ledbetter*
ATTORNEY

United States Patent Office 3,364,460

Patented Jan. 16, 1968

3,364,460

SEAMED SLEEVE CONNECTOR

Martin D. Bergan, Westfield, N.J., assignor to The Thomas & Betts Co., Elizabeth, N.J., a corporation of New Jersey Continuation of application Ser. No. 229,260, Oct. 1, 1962. This application Nov. 9, 1964, Ser. No. 411,673
1 Claim. (Cl. 339—275)

This is a continuation of my parent case, Ser. No. 229,-260, filed Oct. 1, 1962. The invention relates to a new type of die-formed, hard-solder seamed compression connector, for making an improved electrical joint with a stranded wire conductor.

My new electrical connector comprises a copper sleeve which is die-formed (rolled up) from copper stock, has a saw-tooth shaped butt-edge seam extending from end to end thereof, that is bonded by solder and is adapted to be compressed by an indentor tool into the flexible wire strands of an electrical conductor.

Of the three parts recited in the preceding paragraph, it is pointed out that the copper sleeve and the wire strands, as known in the art, are somewhat softer (more ductile) than the solder that bonds the butt-edge seam of the connector sleeve.

A purpose of this invention is to improve on the straight type of hard solder seam shown in the prior art, as represented by Matthysse Patent 2,586,471 (filed June 12, 1944 and granted Feb. 19, 1952). This prior patent shows a straight hard solder seam (called brazed material) which keys (bites) into the strands of a flexible electrical conductor, as described in column 2, lines 17, 18 and 19 of said prior patent.

Since the prior art seam is straight, i.e., rectilinear, from end to end of the copper sleeve, it follows that the keying (biting-in) of the hard solder (or brazed straight line seam) only contacts a comparatively few of the soft copper strands of an electrical conductor.

In my improved solder seam, the bonding hard solder line thereof is in part circumferential of the copper sleeve body. This is in contrast to the straight prior art seam. Accordingly, my solder seam keys (bites) into a great number of the conductor strands, thereby not only increasing the electrical conductivity of the joint to decrease its heating, but also increasing the mechanical strength against pull-out of the wire strands from the copper sleeve.

The accompanying drawings illustrate an example of the invention, in which the first two views provide a comparison of my invention with the prior art, i.e.:

FIG. 1 illustrates the aforementioned prior art copper sleeve having a straight (rectilinear) hard solder seam which embeds (bites) into a minimum number of the conductor strands.

FIGS. 2 and 3, in contrast thereto, show my new copper sleeve connector having the aforementioned characteristic saw-tooth shaped solder seam, which has an advantageous and partial circumferential reach around the body of the sleeve, thus engaging a large number of the wire strands.

In FIG. 3, the shaded area SA (seam-area) indicates a partial circumferential portion of the saw-tooth shaped hard solder seam for the fabricated copper sleeve.

Figure 10:
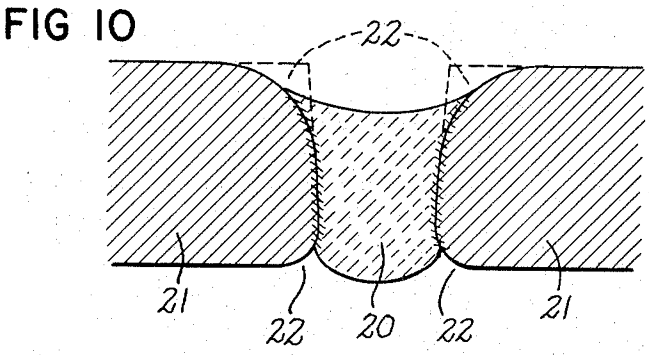

FIG. 10 shows that spelter or brazing material 20 cannot satisfactorily be used to bond the seam of a copper sleeve 21, since said material 20 melts (fuses) at a much higher temperature than the copper sleeve 21 and, therefore, melts down (impairs) the inside and outside sharp corner edges 22 of said copper sleeve 21. Thus, FIG. 10 shows the advantages of hard solder 14 which fuses at a lower temperature than the spelter or brazing material 20 and does not soften and impair the edges 22 of the copper sleeve.

The drawings show a rolled up soft copper sleeve connector 1, which may have a bolting or screw-fastening tongue 2, of known form. It is a prior art type of sleeve, into which the bare-ended flexible wire strands S (electrical conductor) is disposed. The conductor wire strands S are covered by insulation W in the usual way.

The prior art fabricated sleeve 1 has a conventional solder seam 4, extending from end to end, which bonds the edges of the straight seam. This prior art straight solder seam 4 is shown open at 5 as crossing only a few of the wire strands S. A flat area 6 on one side (FIG. 1) of the sleeve shows that an indentor (pressure) tool has squeezed said one side into the wire strands S, to make a homogeneous connection of the soldered sleeve with the wire strands.

Figures 1, 2:
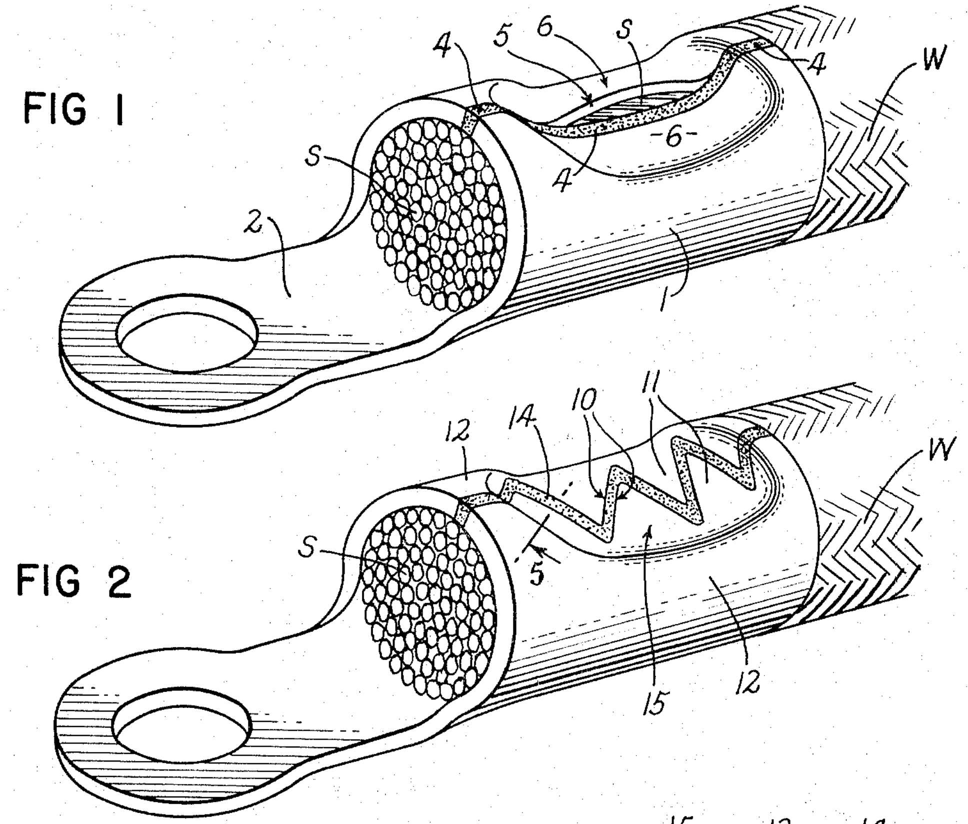
Figure 3:
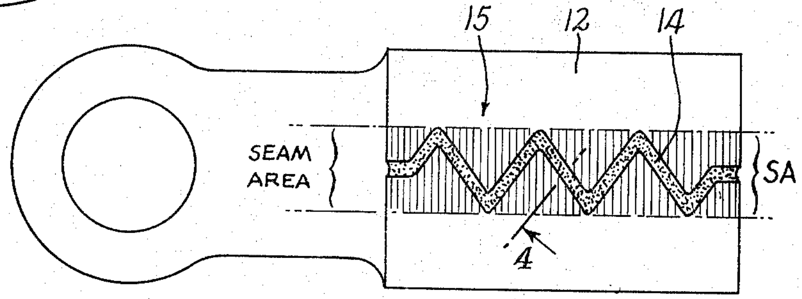

Coming to FIG. 2 and the other views showing my invention, it is seen that two lengthwise rows of saw-tooth edges 10, forming saw-tooth segments 11, are die-formed in my new copper sleeve 12. The saw-tooth edges 10 are bonded (integrated) by hard solder 14. The solder is somewhat harder (less ductile) than the soft copper sleeve 12 and soft wire strands S.

When an indentor tool is applied to my new sleeve 12, a seam area SA is squeeze-formed, as shown in FIG. 2 and all subsequent views. This results in a flat or compressed squeezed seam area 15 which, in part, is circumferential of the sleeve body, in contrast to the rectilinear seam of the prior art.

Figure 5:
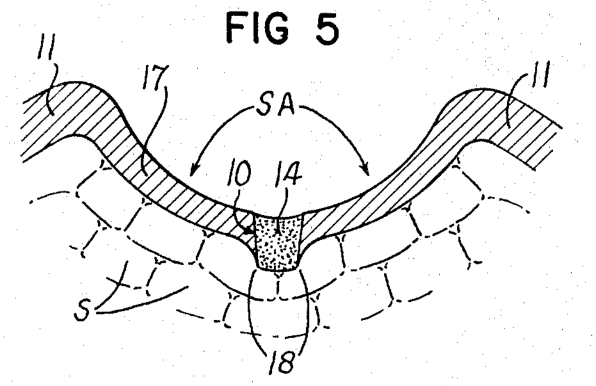
FIG. 5 shows an enlarged transverse fragmentary section on the line 5 of FIG. 2, showing how the hard solder seam bites part way around into the compressed conductor copper strands.
Figure 4:
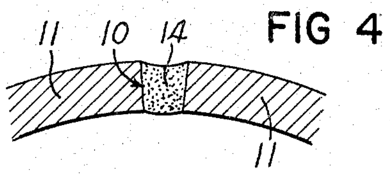
FIG. 4 shows an enlarged fragmentary cross section of the copper sleeve and its hard solder line 14 which bonds the saw-tooth seam.
Figure 6:
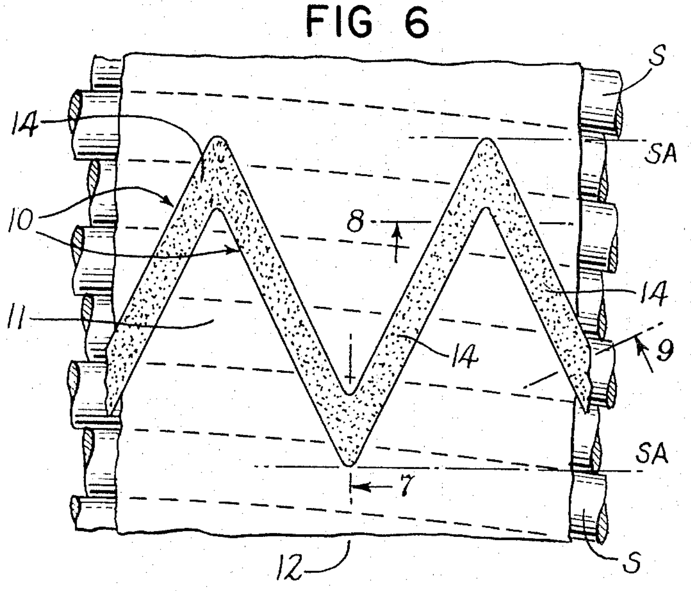
FIG. 6 is an enlarged top fragment of FIGS. 2 and 3.
Figure 7:
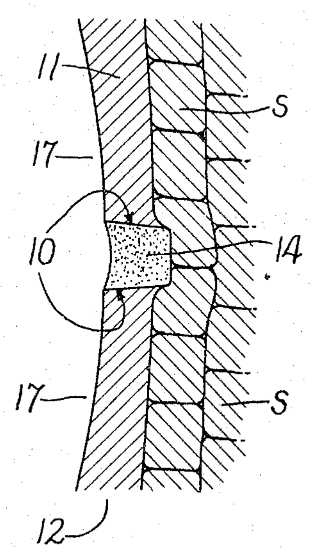
FIG. 7 is a cross section on the line 7 of FIG. 6.
Figure 8:
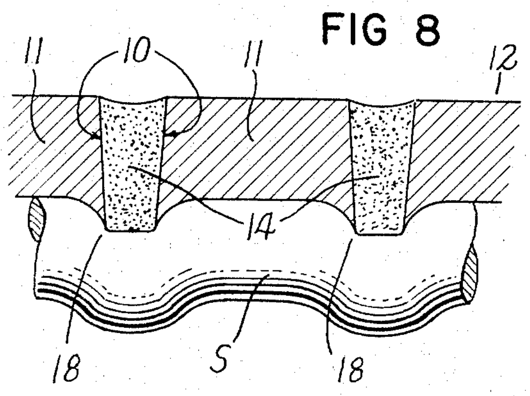
FIG. 8 is an enlarged cross section on the line 8 of FIG. 6.
Figure 9:
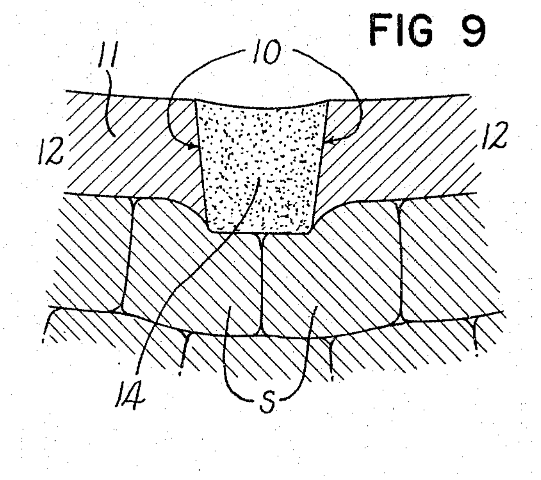
FIG. 9 is an enlargement of one of the bite-in solder seams of the previous views.

It is noted that the hard solder saw-tooth seamed sleeve 12 stretches and thins down, as at 17 (FIGS. 5 and 7). This mode of operation tends to expose and make more effective the sharp inner edge corners 18 (see FIG. 5) of the hard solder line 14, and causes the saw-tooth edges to bite through the insulative oxide on the conductor and make contact with a greatly enlarged number of wire strands S. This is an advantage when a compression (indentor) tool squeezes down on the copper sleeve 12 and over the entire expanse of the partial circumferential seam-area SA.

Inasmuch as the solder bond 14 is of much harder texture than the ductile copper sleeve 12 and wire strands S, it follows that the solder line 14 is squeezed ahead of the soft copper material and thus bites into the conductor. It is seen that the saw-tooth solder line 14 encompasses and bites into a great many more wire strands S than the conventional straight seam 5 shown in FIG. 1 and in the prior art.

This improvement enhances the utility of squeeze-type connectors because of the greater contact area. It increases the conductivity of current flow and also increases the strength (resistance) against pulling the electrical conductor from the sleeve 12, i.e., provides greater pull out value, in contrast to the straight seam of the prior art.

What is claimed is:

1. (a) An electrical compression connector comprising a copper sleeve, a saw-tooth shaped butt-edge open seam extending from end to end of the sleeve, i.e., a space is provided between the butt-edge teeth, hard solder fused within said space, thus closing and bonding the butt-edge teeth, and forming a seam-area SA that occupies a portion of the sleeve circumference;

(b) whereby a stranded flexible wire disposed within said sleeve has a great number of its strands criss-crossed by the solder lines (14) of the seam-area SA and, when tool-compressed, the hard solder (being less ductile than the sleeve) is urged ahead of said sleeve and serves to produce a plurality of bite-in, keying contacts with and into said great number of wire strands, throughout said circumference portion.

References Cited

UNITED STATES PATENTS

| | | | |
|---|---|---|---|
| 67,624 | 8/1867 | Wooten | 85—82 |
| 946,990 | 1/1910 | Swope | 339—251 |
| 1,450,935 | 4/1923 | Anderson | 29—482 |
| 1,773,068 | 8/1930 | Vienneau | 29—482 |
| 1,998,016 | 4/1935 | Hoover | 339—230 |
| 2,549,868 | 4/1951 | Vickery | 29—493 X |
| 2,586,471 | 2/1952 | Matthysse | 339—275 |
| 2,643,446 | 6/1953 | Matthysse et al. | 29—155.55 |

MARVIN A. CHAMPION, *Primary Examiner.*

PATRICK A. CLIFFORD, *Examiner.*